United States Patent [19]
Aksyuk et al.

[11] Patent Number: 5,963,367
[45] Date of Patent: Oct. 5, 1999

[54] MICROMECHANICAL XYZ STAGE FOR USE WITH OPTICAL ELEMENTS

[75] Inventors: Vladimir A. Aksyuk, Piscataway; David J. Bishop, Summit; Peter L. Gammel, Millburn, all of N.J.

[73] Assignee: Lucent Technologies, Inc., Murray Hill, N.J.

[21] Appl. No.: 08/935,971

[22] Filed: Sep. 23, 1997

[51] Int. Cl.$^6$ .............................. G02B 21/26; H02N 1/00
[52] U.S. Cl. ......................... 359/392; 359/393; 310/309
[58] Field of Search .................................. 354/391, 392, 354/393; 248/913; 310/309

[56] References Cited

U.S. PATENT DOCUMENTS

| | | | |
|---|---|---|---|
| 5,148,157 | 9/1992 | Florence | 340/783 |
| 5,165,297 | 11/1992 | Krueger | 74/479 |
| 5,536,988 | 7/1996 | Zhang et al. | 310/309 |
| 5,552,654 | 9/1996 | Konno et al. | 310/309 |
| 5,554,851 | 9/1996 | Hirai et al. | 250/442.11 |

FOREIGN PATENT DOCUMENTS

| | | |
|---|---|---|
| 0 421 437 A2 | 4/1991 | European Pat. Off. . |
| WO 93 18525 A1 | 9/1993 | WIPO . |
| WO 94 25888 A1 | 11/1994 | WIPO . |

OTHER PUBLICATIONS

Fan et al., "Self–Assembled Microactuated XYZ Stages for Optical Scanning and Alignment," Transducers '97, 1997 Int'l Conf. Solid State Sensors and Actuators, Chicago, Jun. 16–19, 1997, pp. 319–322.

Indermuehle et al., "Design and Fabrication of an Overhanging XY–Microactuator with Integrated Tip for Scanning Surface Profiling," v. 43, Sensors and Actuators A, pp. 346–350 (1994).

Betzig et al., "Near–Field Optics: Microscopy, Spectroscopy, and Surface Modification Beyond the Diffraction Limit," vol. 257 Science, pp. 189–195 (Jul. 10, 1992).

*Primary Examiner*—Cassandra Spyrou
*Assistant Examiner*—Mark A. Robinson

[57] ABSTRACT

A micromachined xyz stage, and microscopes utilizing such a stage, are disclosed. The xyz stage includes co-planar x- and y-drive means linked to a sample stage. Such x- and y-drive means are operable to position the sample stage in an x-y plane. The xyz stage further includes z-drive operable to moves the sample stage out of the x-y plane. The z-drive can be implemented by suspending a flat-plate electrode over the sample stage using hinged plate supports. As a voltage is applied across the plate electrode and the sample stage, an electrostatic force is generated, causing the sample stage to move towards the plate electrode. The hinged plate supports facilitate assembly of the z-drive, in addition to providing support for it in its assembled configuration. By incorporating an optical fiber, the aperture of which has be drawn down to submicron size, a near-field scanning optical microscope can be formed. By forming a micromachined tip on the xyz stage, a scanning tunneling microscope or an atomic force microscope can be formed.

17 Claims, 4 Drawing Sheets

MICROMECHANICAL XYZ STAGE FOR USE WITH OPTICAL ELEMENTS

FIELD OF THE INVENTION

The present invention relates to an xyz stage for microaligning an article placed thereon and its use in conjunction with optical elements.

BACKGROUND OF THE INVENTION

Near-field scanning optical microscopes (NSOMs) having submicron spatial resolution are physically large and expensive. Such large size and high cost make their use prohibitive in a variety of applications wherein such submicron resolution would be very useful. For example, a very small, inexpensive, high resolution microscope would be useful for remote sensing applications, such as wherein the information desired is a pattern or a change in pattern or shape, or for imaging in hostile environments and monitoring devices/systems wherein the microscope becomes contaminated by radiation, chemicals or organisms and should be discarded thereafter.

One difficulty in the development of a miniature NSOM is providing a suitable xyz stage. In NSOMs, the sample being observed is scanned to create an image. If such scanning is performed via a movable stage, such a stage must be capable of precisely-controlled micron-scale movement in the x-y plane. One such stage has been described by Indermuehle et al. in "Design and Fabrication of an Overhanging xy-Microactuator with Integrated Tip for Scanning Surface Profiling," vol. 43, Sensors and Actuators A, pp. 346–50 (1994).

In addition, the working distance, i.e., the distance between the optical aperture and the sample, is preferably on the order of the size of the aperture, which may be submicron-sized. Thus, the stage must be precisely positionable in submicron-sized increments in the z-plane, as well. One such miniature xyz stage has been disclosed by Fan et al. in "Self-Assembled Microactuated XYZ Stages for Optical Scanning and Alignment," Proc. 1997 Int'l. Conf. Solid-State Sensors and Actuators (Transducers '97), pp. 319–22, 1997. Fan's xyz stage employs sliding/rotating mechanical joints. Such elements may affect repeatability of motion and introduce noise due to friction.

Thus, there is a need for a robust, miniature xyz stage capable of precisely controlled submicron-scale movement.

SUMMARY OF THE INVENTION

A micromachined xyz stage, and a near-field scanning optical microscope (NSOM) utilizing such a stage, are disclosed. According to the invention, an x-drive means and a y-drive means are disposed on a support surface, such as a wafer, and are linked to, and support, a sample stage. The x-drive means and y-drive means are coplanar, and are operable to position the sample stage in an x-y plane. In a preferred embodiment, the drives are configured as "comb" drives.

The xyz stage further includes z-drive means suitably configured for generating an electrostatic force that moves the sample stage out of the x-y plane. In one such suitable configuration, the z-drive means is a parallel-plate actuator. In one embodiment, the parallel-plate actuator is implemented by suspending a flat-plate electrode over the sample stage using appropriate support means. As a voltage is applied across the plate electrode and the sample stage, the sample stage moves out of the x-y plane towards the plate electrode. The support means can be rotatable hinged plates. Such rotatable hinged plates facilitate assembly of the z-drive means, in addition to providing support for it in its assembled configuration. The z-drive means is physically adapted for allow access to the sample stage.

The present xyz stage may be advantageously used in conjunction with optical elements. For example, in one embodiment, the xyz stage is used to form a NSOM. According to the invention, the z-drive means receives the tip of an optical fiber that has be drawn down to submicron size. The optical fiber delivers light to a sample disposed on the sample stage beneath the z-drive means. The stage is moved using the comb drives, and the light reflected from, or transmitted through, the sample is collected by far-field optics and delivered to processing electronics. The processing electronics may include a light meter connected to a computer collectively operable to generate a representation of the sample, such as by an intensity position plot.

In a further embodiment, a micromachined tip can be formed on the present xyz stage for use in scanning probe microscopy.

BRIEF DESCRIPTION OF THE DRAWINGS

Further features of the invention will become more apparent from the following detailed description of specific embodiments thereof when read in conjunction with the accompanying Figures in which.

DETAILED DESCRIPTION

Figure 1:
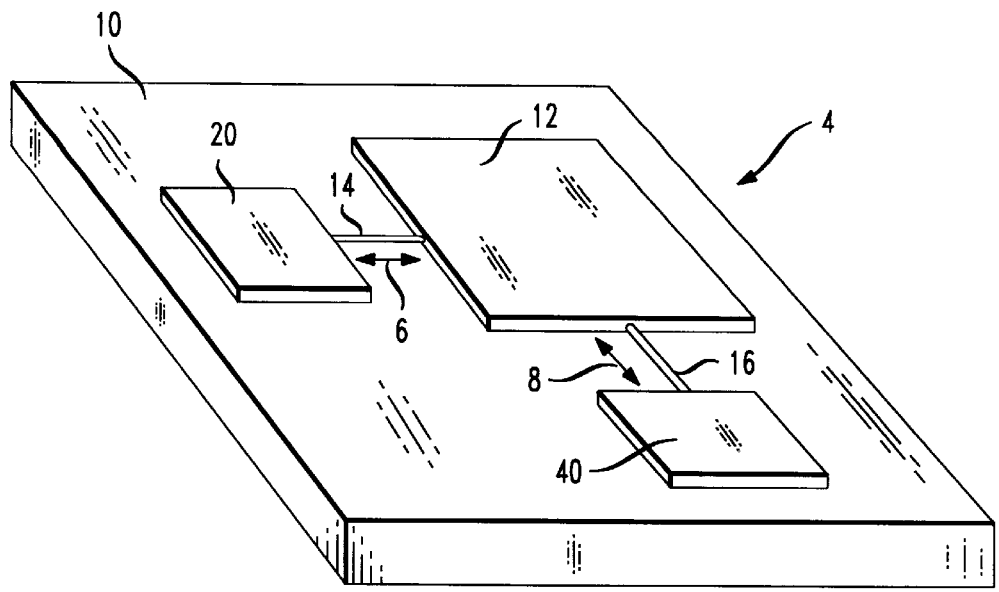
FIG. 1 shows a xy stage and associated x-drive means and a y-drive means.

FIG. 1 shows a xy stage 4 disposed on a wafer 10. The xy stage 4 includes a sample stage 12 that is linked, via linkages 14 and 16 to respective x-drive means 20 and y-drive means 40. The x-drive means 20 is operable to move the sample stage 12 in the directions indicated by direction vector 6. The y-drive means 40 is operable to move the sample stage 12 in the directions indicated by direction vector 8. Controlled actuation of the x- and y- drive means 20, 40 allows positioning the sample stage 12 in an x-y plane.

Figure 2:
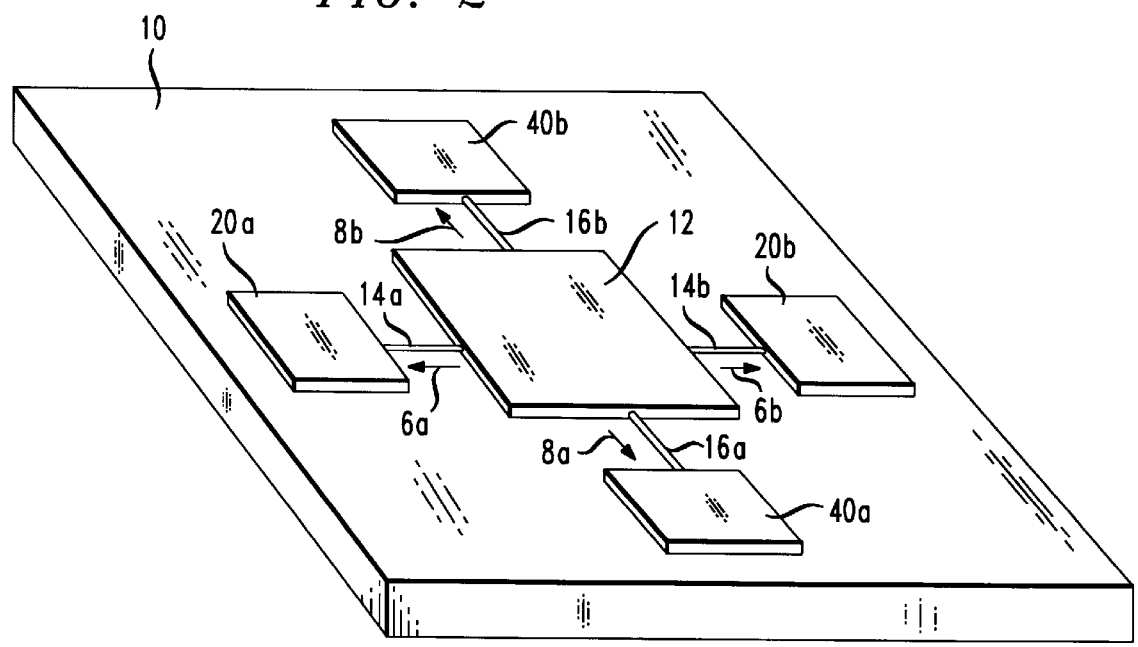
FIG. 2 shows an embodiment wherein each of the x- and y- drives of FIG. 1 have two actuators.

In a basic embodiment, each of the x- and y- drive means 20, 40 comprise two drive actuators 20a, 20b and 40a, 40b, as shown in FIG. 2. The drive actuators 20a, 20b are linked to the sample plate 12 via respective linkages 14a and 14b. The drive actuators 40a, 40b are linked to the sample plate 12 via respective linkages 16a and 16b. Two such drive actuators are required for each of the drive means 20, 40 since, in the presently described basic embodiment, the drive actuators are operable to drive in only one direction, i.e., to push, or, more preferably, to pull. Thus, drive actuator 20a is operable to apply a force to the sample plate 12, via the linkage 14a, so that the sample plate moves toward the drive actuator 20a as indicated by the direction vector 6a. Similarly, drive actuators 20b, 40a and 40b are operable, when actuated, to move the sample plate 12 in the direction indicated by respective direction vectors 6b, 8a and 8b.

Figure 3:
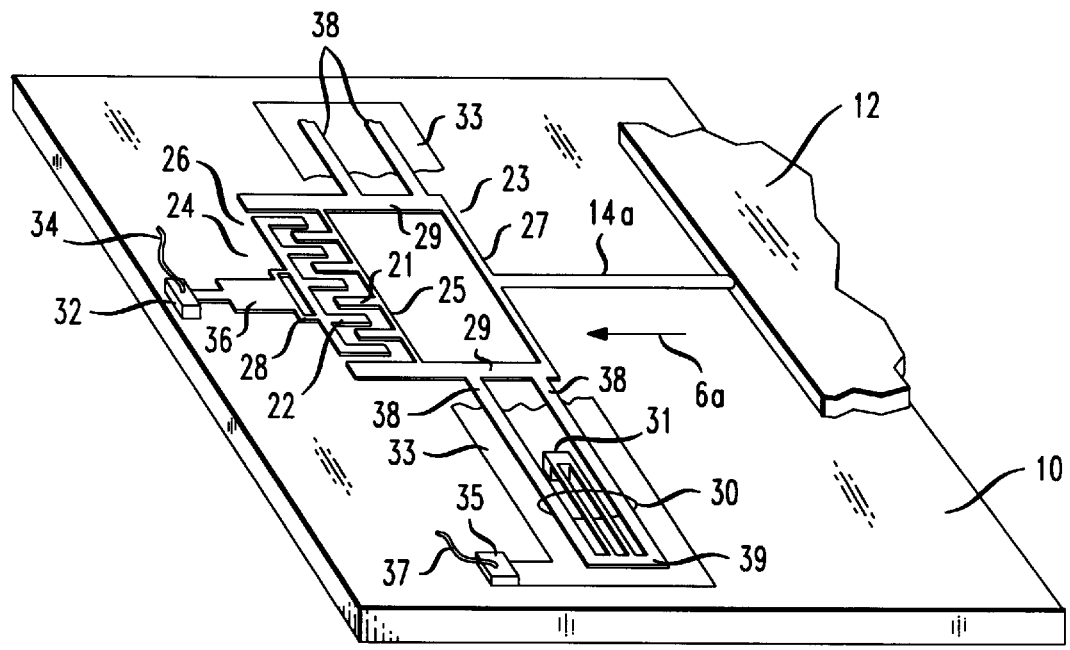
FIG. 3 shows an embodiment of the actuators of FIG. 2.

In one embodiment, the drive actuators 20a, 20b, 40a, 40b are configured as conventional "comb" drives. The comb drive 20a is illustrated in FIG. 3. All four comb drives are identical; it is the placement of the comb drive that determines the direction in which it moves the sample plate 12 upon actuation.

As shown in FIG. 3, the comb drive 20a comprises interdigitated movable teeth members 21 and fixed teeth members 22. The movable teeth members 21 depend from a first portion 25 of stage 23. The linkage 14a depends from a second portion 27 of the stage 23. Fixed teeth members 22 depend from a first portion 26 of a frame 24. A second portion 28 of the frame 24 is disposed on wire trace 36. Wire trace 36 is in electrical contact with bond pad 32 which receives a wire 34 for delivering a voltage to the fixed teeth 22 of the comb drive 20a.

Arms 38 of drive supports 30 (only one drive support is shown in its entirety for clarity) are attached to the stage 23 at stage side members 29. The drive supports 30 support the stage 23, and depending movable teeth members 21 and linkage 14a, above underlying layers, e.g., the support surface 10 or any conductive layers or insulating layers disposed thereon. The drive supports 30 elevate the stage 23, linkage 14a and movable teeth members 21 about 2 microns above such underlying surfaces. A conductive layer 33, typically polysilicon, is disposed on the support surface 10 beneath the drive supports 30, the stage 23, the movable teeth members 21, etc. The drive support 30 is in electrical contact with, and fixed to, the conductive layer 33, at riser member 31. The conductive layer 33 is in electrical contact with a wire bond pad 35 that receives a wire 37 for delivering a voltage to the stage 23 and, thereby, to the movable teeth members 21.

In operation, a voltage is placed across the interdigitated teeth members 21 and 22 generating an electrostatic force therebetween. In response, the movable teeth members 21 are pulled towards the fixed teeth members 22 as indicated by the direction vector 6a. Since the sample plate 12 is connected to the movable teeth members 21 via the stage 23 and linkage 14a, the sample plate is moved in the direction indicated by the direction vector 6a, as well.

The other three comb drives 20b, 40a, 40b are identically constructed and operable to pull the sample plate 12 in the direction indicated by the respective direction vectors 6b, 8a and 8b shown in FIG. 2. The xy stage 4 described above and illustrated in FIGS. 1–2 is known in the prior art. The x- and y- drive means 20, 40 may be implemented using a variety of suitably-configured actuators known to those skilled in the art. The comb drives described above are one of many suitable embodiments of such an actuator.

In the exemplary embodiment shown in FIG. 3, the drive support 30 is "folded" at the member 39, i.e., the arms 38 project from the member 39 in a direction 180° opposed to the direction in which arms project from the anchor member 31. That arrangement is referred to as a "folded beam" configuration. It should be appreciated that in other embodiments, the drive supports may be configured differently, as is within the capabilities of those having ordinary skill in the art, yet still provide support for, and, optionally, electrical contact with, drive members.

An xyz stage 2 is formed by adding a z-drive means to the aforedescribed xy stage 4. According to the present invention, the z-drive means is suitably configured for generating an electrostatic force that moves the sample stage 12 out of the x-y plane. In an exemplary embodiment illustrated in FIG. 4, z-drive means 48 comprises a parallel-plate actuator and support means 54. For clarity of presentation, the y-drive means 40 is omitted from FIG. 4.

Figure 4:
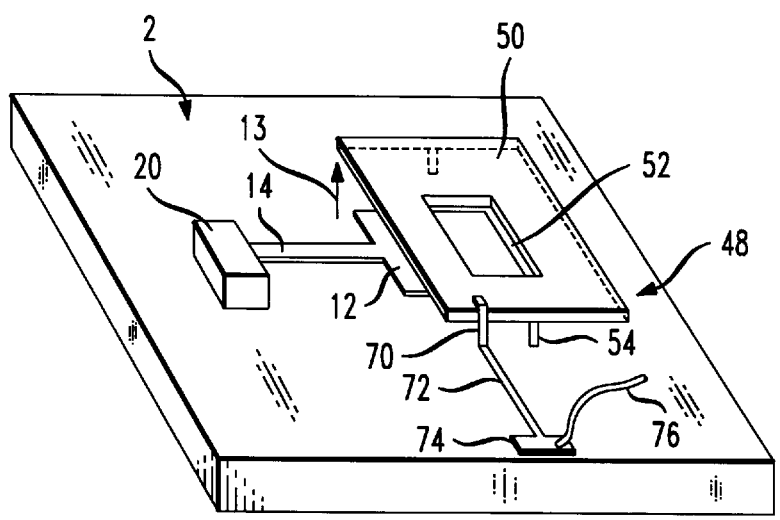
FIG. 4 shows an xyz stage according to the present invention.

In the embodiment shown in FIG. 4, the parallel-plate actuator is realized by suspending a plate electrode 50 over the sample stage 12 via a support means 54. In some embodiments, the plate electrode 50 has an opening 52 therethrough to allow access to the sample stage 12 from the normal. The plate electrode 50 is in electrical contact with an electrode 70, which is in turn in electrical contact with wire trace 72. The wire trace 72 is in electrical contact with a bond pad 74 that receives wire 76.

In operation, a voltage is delivered to the plate electrode 50 via the wire 76, bonding pad 74, wire trace 72 and electrode 70. An electrostatic force is generated between the sample stage 12 and the plate electrode 50 that causes the sample stage to move out-of-plane towards the plate electrode. Using a precision capacitance bridge, the position of the sample stage 12 can be sensed and controlled to within about 20 nm or less in the z-direction. Thus, the plate electrode 50 and associated elements, in conjunction with the x-drive means 20 and the y-drive means 40, are collectively operable to move the sample stage 12 in three-dimensional space.

In preferred embodiments, support means 54 is an arrangement of hinged plates suitably-configured for lifting the plate electrode 50 and permanently suspending it over the sample stage 12. The hinged plates utilized in conjunction with the present invention are well known to those skilled in micromachining technology. See, for example, Pister et al., "Microfabricated Hinges," vol. 33, Sensors and Actuators A, pp. 249–56, 1992, incorporated by reference herein. Technology for fabricating such hinges and micro devices formed therefrom is available from MEMS Technology Application Center at North Carolina (MCNC) under Defense Advanced Research Projects Agency (DARPA)-supported Multi-User MEMS Processes (MUMPs). MCNC MUMPs technology utilizes three polysilicon layers in which hinged plates are formed using photolithographic methods. See also assignee's co-pending patent applications MICRO MACHINED OPTICAL SWITCH filed May 15, 1997 as Ser. No. 08/856,569; METHOD AND APPARATUS FOR MAKING A MICRO DEVICE filed May 15, 1997 as Ser. No. 08/856,565, both of which applications are incorporated by reference herein.

Figure 5:
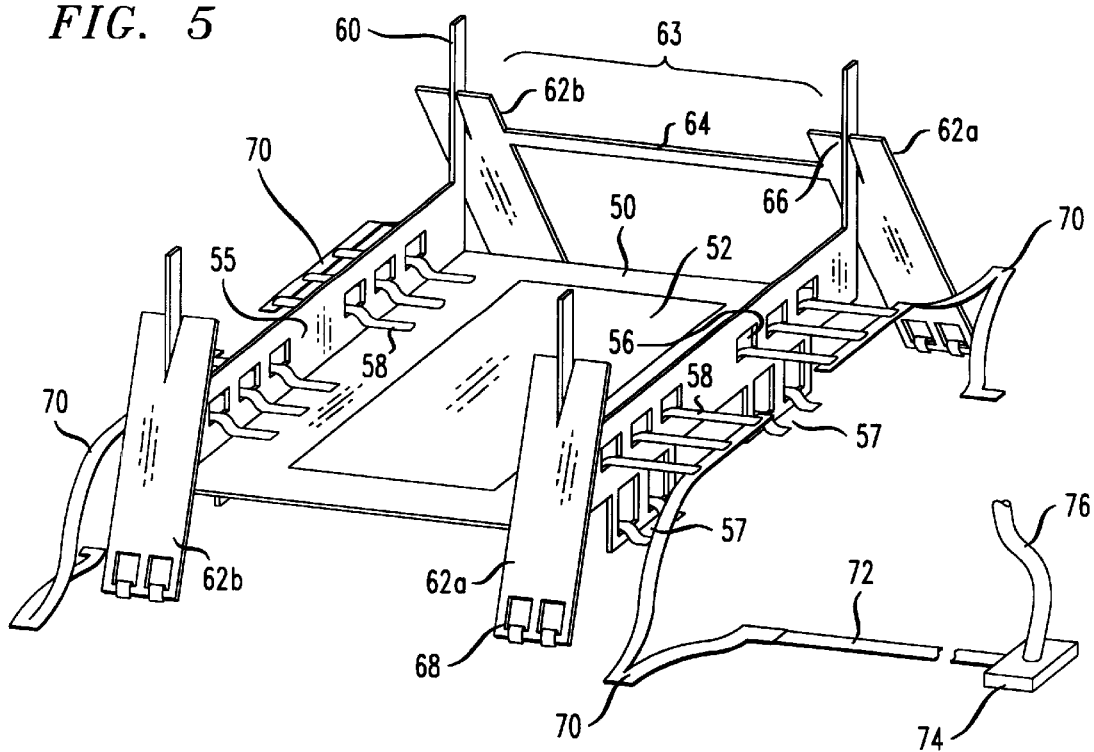
FIG. 5 shows an exemplary embodiment of a z-drive means according to the present invention.
Figure 6:
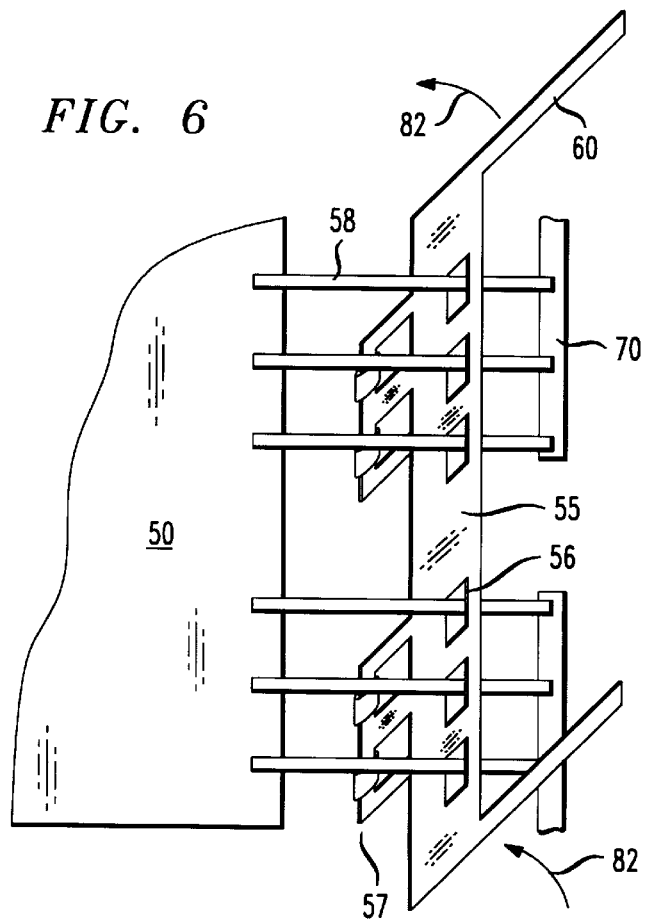
FIG. 6 shows an exemplary embodiment of a hinged support plate for use in conjunction with the present z-drive means.

An exemplary embodiment of support means 54 utilizing such hinged plates is illustrated in FIG. 5. For clarity of illustration, the xy stage 4 and associated elements are not shown in FIG. 5. In the embodiment illustrated in FIG. 5, the support means 54 comprises two hinged support plates 55, and two hinged support plate locks 63. As shown in FIGS. 5 and 6, each support plate 55 includes hinges 57, a plurality of openings 56 and two risers 60. The openings 56 receive conductive fingers 58 that depend from electrodes 70 at one end, and the plate electrode 50 at the other end. The fingers 58 are dual function. One function is for providing electrical connection to the plate electrode 50. A second function is to aid in assembling the plate electrode 50/support means 54, as described below.

The various plates, electrodes and other elements comprising the present xyz stage are patterned in one of two polysilicon layers deposited on the support surface 10, such as by using the MCNC MUMPs process. Such elements are disposed in the plane of the support surface 10 when they are formed. It will be appreciated that to form the z-drive means shown in FIG. 5, those elements must be either rotated (the support plates 55, the support plate locks 63) or lifted (the plate electrode 50) out of the plane of the support surface 10.

The plate electrode 50 may be lifted off the support surface 10 by lifting the unhinged end of each support plate 55 so that the support plate rotates about hinge 57. FIG. 6 illustrates such lifting and rotation, along the path 82, for one of the support plates 55. As a support plate 55 is rotated in the illustrated direction, the fingers 58 passing through openings 56 in the support plates are moved upwardly relative to the support surface 10. As the fingers 58 are attached to the plate electrode 50, it is likewise moved out-of-plane.

Figure 7:
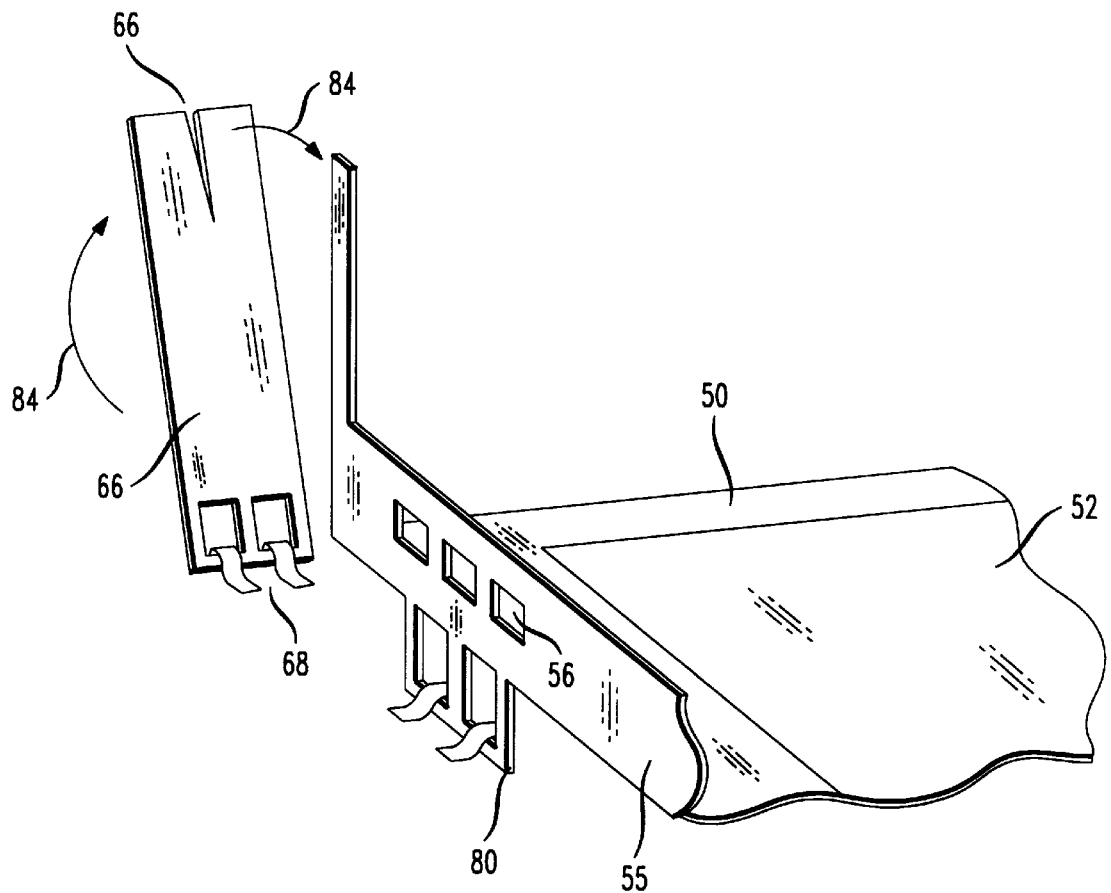
FIG. 7 shows an exemplary embodiment of a hinged support plate lock for use in conjunction with the present z-drive means.

The plate electrode 50 is lifted off the support surface 10 to a final position, typically about 30 microns over the support surface. When the plate electrode 50 is at that position, the support plates 55 assume a substantially vertical orientation relative to the support surface 10. The support plates 55 may be fixed in the aforementioned vertical orientation via support plate locks 63. In the exemplary embodiment shown in FIG. 5, each support plate lock 63 comprises two hinged plates 62a, 62b and interconnecting member 64. Each hinged plate 62a, 62b has a slot 66 formed at the unhinged end. To fix the support plates 55 in position, the support plate locks 63 are lifted, such as by placing a micropipette under the interconnecting member 64. As each support plate lock is lifted, it rotates about hinge 68 towards the suspended plate electrode and support plates 55. Rotation about the hinge 68 along a path 84 is illustrated for one of the support plate locks 63 in FIG. 7. Such rotation continues until slot 66 engages a projection or riser 60 disposed at each end of support plates 55. In addition, an adhesive can be placed on the hinges 57, 68 and in slots 66 engaging risers 60 to prevent the support plate 55 or the support plate locks 63, respectively, from moving. The adhesive can be applied according to a method described in the assignee's copending patent application entitled METHOD FOR FORMING MICRON-SIZED AND SMALLER LIQUID DROPLETS filed May 15, 1997 as Ser. No. 08/856,566, incorporated by reference herein.

It will be appreciated that a variety of other arrangements for lifting and supporting plate electrode 50 and for forming a parallel plate actuator and associate support means, can be utilized in conjunction with the present invention.

The present xyz stage may be advantageously used in conjunction with optical elements. For example, in one embodiment, the xyz stage is used in combination with an optical fiber having a micron- or smaller- sized aperture for forming a near-field scanning optical microscope (NSOM).

Near-field microscopes work by using a very small aperture to "focus" light to a small spot size. The spot size can be many times smaller than the wavelength λ of light. The light is scanned over a sample, and collected by far field optics. The collected light is then delivered to processing electronics for measuring intensity or other optical properties and for processing the measurements into an image. See Betzig et al., "Near-Field Optics: Microscopy, Spectroscopy, and Surface Modification Beyond the Diffraction Limit," vol. 257, Science, pp. 189–195, Jul. 10, 1992, incorporated by reference herein.

Figure 8:
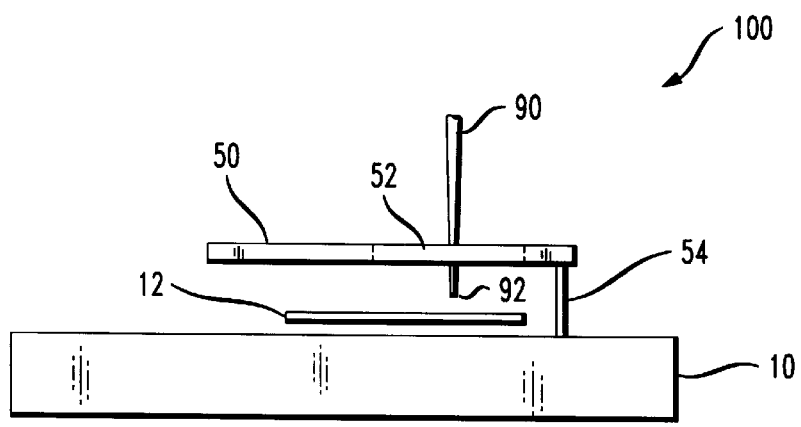
FIG. 8 shows an embodiment of a near-field scanning optical microscope utilizing the present xyz stage.

A NSOM according to the present invention is shown in FIG. 8. For clarity of presentation, neither the x- nor y- drive means 20, 40, are pictured, and the support means 54 is figuratively illustrated. It should be understood that the present NSOM comprises an xyz stage according to the present invention, as well as an optical fiber 90 having a reduced-sized aperture 92. The opening 52 in the plate electrode 50 provides the optical fiber 90 access to the sample stage 12.

As presently implemented, the aperture, which has a diameter typically in the range of about 50 to 100 nanometers (nm), can be formed by drawing down the tip of an optical fiber by known methods. According to one such method, tension is placed on the fiber, and the fiber is heated locally with a focused laser spot. As the fiber heats it begins to flow and separates into two pieces with finely tapered ends. Metal is then deposited at the tapered fiber ends, leaving a small opening at the tip.

It is important to maintain a substantially constant-sized gap between the fiber aperture 92 and the sample stage 12. This is conventionally accomplished by measuring shear force. According to such conventional practice, the fiber, such as the fiber 90 of the present invention, is oscillated using a piezo. The sample stage, such as the sample stage 12, is moved upwardly towards the fiber until some characteristic of the fiber's motion changes. For example, the amplitude of the motion may decrease. Such a change, e.g., a decrease in amplitude, occurs when, due to the proximity of the tip of the fiber to the sample surface, a shear force acts on the fiber tip. The characteristics, e.g., amplitude and frequency, of fiber oscillation can be monitored by observing the same piezo that is used to drive the fiber. In such a case, the AC impedance of the piezo is measured. Alternatively, an additional light source/detector can be used.

In a method according to the present invention, gap size is maintained by monitoring changes in mechanical loss while oscillating the sample stage 12 in the z-direction with an amplitude of about 50 nm. The present method advantageously avoids the shear forces utilize by prior art methods, which can degrade delicate samples. According to the present method, a capacitance bridge is connected to the plate electrode 50 and the sample stage 12. The output from the bridge is capacitance, C, and loss, G. In simplified terms, the bridge applies voltage and measures current. The applied voltage equals the sum of the dc and ac voltage components; i.e., $V_{app}=V_{DC}+V_{AC}$. The dc voltage, which typically is in the range of 0 to about 40 volts, determines the position of the sample stage 12 in the z-direction, i.e., moving towards the plate electrode 50. The ac voltage is typically a much lower value. Only the ac component of the current is measured. The phase sensitive measurement facilitates determining both the capacitive (C) and resistive (G) components of the impedance of the sample stage and plate electrode.

The position of the stage can be determined theoretically based on the physical dimensions of the sample stage (12) and plate electrode (50), etc. and the capacitance measurement. A capacitance/position relationship can then be developed. Preferably, actual measurements of the sample stage (12) and plate electrode (50) spacing are taken in conjunction with capacitance measurements for different applied voltages. In this manner, capacitance may be used to determine the position in the z-direction as a function of dc voltage.

The ac voltage, having a frequency lower than the resonance frequency of the xyz stage, is used to oscillate the stage mechanically around its equilibrium position, as determined by $V_{DC}$. If the probe tip is in the vicinity of the surface of an empty sample stage 12, or of the surface of a sample mounted thereon, forces acts between the tip and the surface. The force affects the oscillation amplitude of the stage. Oscillation amplitude is determined by $V_{AC}$, $V_{DC}$ and mechanical losses, as well as by ac frequency. Since electric losses are negligible, all energy dissipation is due to mechanical loss. Mechanical loss, which is due to air damping, is proportional to the amplitude of the oscillation. Thus, changes in such amplitude can be seen by changes in G. The proximity of the tip to such surface can thus be determined.

Moreover, the present method can be used for tip-to-sample proximating determination by oscillating the sample stage 12 in the x or y directions, as well as in the z-direction. In such a case, the method is a modification of shear force feedback.

Although not pictured in the drawings, the present NSOM also includes controlled voltage sources for actuating the x-drive, y-drive and z-drive and for controlling movement imparted to the sample stage via the x-drive, y-drive and the z-drive. Additionally, as previously noted, the capacitance of the z-drives and/or x- and y-drives can be measured to control sample stage movement.

Additionally, the NSOM includes far-field optics operable to collect light reflected from, or transmitted through, a sample on the sample stage. Such optics typically includes an objective lens for collecting reflected/transmitted light, and optics to deliver such light to a detector, and the detector. The detector can be a photomultiplier, although a variety of other light detectors suitable for measuring intensity and other characteristics may suitably be used. For example, polarization, time delay, and changes in polarization, spectrum and the like may suitably be used. The detector is, in turn, connected to a processor suitably configured or programmed for processing the intensity/contrast measurements into an image.

In a first exemplary embodiment, the NSOM can be arranged on a table top. In such an embodiment, a conventional microscope can advantageously be used to provide the far-field optics. In particular, the objective lens, and other optics of a conventional microscope for delivering light to a camera port of the microscope are used, in conjunction with a commercial lightmeter mounted on that port.

In a second exemplary embodiment, the NSOM can be arranged within a cryostat for low temperature studies, such as for studying superconductivity. In such an embodiment, the far-field optics comprise a grin lens, a fiberoptic image conduit for delivering light out of the cryostat, and a lightmeter.

As though skilled in the art will appreciate, the far-field collection optics, and illumination optics (not discussed), typically include polarizers, filters, and a variety of other components, as well. See, for example, Betzig et al., "Near-Field Optics: Microscopy, Spectroscopy, and Surface Modification Beyond the Diffraction Limit," previously referenced.

In a further embodiment of the present invention, a scanning probe microscopy (SPM) probe, not shown, can be disposed on the present xyz stage. In some embodiments, such a probe can be fabricated by micromachining, such as, for example, a micromachined silicon tip. The SPM probe allows the present xyz stage to be used, for example, for atomic force microscopy (AFM) or scanning tunneling microscopy (STM).

Both AFM and STM involve the accurate movement and position detection of a sharp sensing tip. See Indermuehle et al. in "Design and Fabrication of an Overhanging xy-Microactuator with Integrated Tip for Scanning Surface Profiling," vol. 43, Sensors and Actuators A, pp. 346–50 (1994), incorporated by reference herein.

Although specific embodiments of this invention have been described herein, it is to be understood that these embodiments are merely illustrative of the principles of this invention. Numerous and varied modifications may occur to, and be implemented by, those of ordinary skill in the art in view of the present teachings without departing from the scope and the spirit of the invention.

We claim:

1. An xyz stage operable for movement in three dimensions, comprising:
   a sample stage;
   a x-drive physically configured to move the sample stage along a first axis;
   a y-drive physically configured to move the sample stage along a second axis, wherein the second axis is co-planar with the first axis; and
   a z-drive physically configured to move the sample stage along a third axis that is orthogonal to the first and second axes, said z-drive comprising:
   said sample stage and an electrode, said electrode being suspended over said sample stage by a support that includes a support plate that is rotatably-attached to a support surface.

2. The xyz stage of claim 1, wherein said electrode is a plate electrode.

3. The xyz stage of claim 2, wherein said support plate has openings that receive electrically-conductive members depending from the plate electrode.

4. The xyz stage of claim 3, wherein said conductive members are in electrical communication with voltage-receiving means.

5. The xyz stage of claim 2, further comprising a capacitance bridge that is electrically connected to said sample stage and said plate electrode.

6. The xyz stage of claim 1, wherein the support plate is rotatably-attached to the support surface by a hinge.

7. The xyz stage of claim 6, wherein the support further comprises a support plate lock for fixing the support plate in an orientation that is out of plane relative to the support surface.

8. The xyz stage of claim 7, wherein the support plate lock comprises a plate rotatably-attached to the support surface, and further wherein the plate is physically adapted to engage a projection depending from the support plate.

9. The xyz stage of claim 8, wherein the support plate lock is rotatably-attached to the support surface by a hinge.

10. The xyz stage of claim 1, wherein the x-drive is a comb drive.

11. The xyz stage of claim 10, wherein said y-drive is a comb-drive.

12. The xyz stage of claim 10, wherein said comb-drive comprises: interdigitated movable teeth members and fixed teeth members, wherein:
   said movable teeth members are mechanically linked to said sample stage, and said fixed teeth members are mechanically linked to said support surface.

13. The xyz stage of claim 12, said comb-drive further comprising a drive stage, wherein:
   said movable teeth members depend from a first portion of said drive stage;
   a linkage depends from a second portion of said drive stage, said linkage mechanically linking said drive stage to said sample stage.

14. The xyz stage of claim 13, said comb-drive further comprising a drive support that depends from said drive stage and supports said drive stage above said support surface.

15. The xyz stage of claim 14, wherein said drive support is electrically conductive and is operable to deliver a voltage to said drive stage.

16. The xyz stage of claim 14, wherein said drive support has a folded beam configuration.

17. The xyz stage of claim 14, wherein said drive support, said drive stage and said sample stage comprise polysilicon.

* * * * *